(12) United States Patent
Imamura et al.

(10) Patent No.: US 8,132,527 B2
(45) Date of Patent: Mar. 13, 2012

(54) APPARATUS FOR APPLYING ELECTRODE MIXTURE PASTE WITH HOMOGENEOUS DISTRIBUTION OF COATING AMOUNT OF ELECTRODE MIXTURE PASTE

(75) Inventors: Kimihiro Imamura, Kanagawa (JP); Hiroyuki Usui, Kanagawa (JP); Tadakazu Seto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 959 days.

(21) Appl. No.: 11/919,233

(22) PCT Filed: Apr. 11, 2006

(86) PCT No.: PCT/JP2006/307618
§ 371 (c)(1),
(2), (4) Date: Apr. 29, 2008

(87) PCT Pub. No.: WO2006/115036
PCT Pub. Date: Nov. 2, 2006

(65) Prior Publication Data
US 2009/0053399 A1    Feb. 26, 2009

(30) Foreign Application Priority Data
Apr. 25, 2005  (JP) ................. 2005-126292

(51) Int. Cl.
*B05C 3/02*   (2006.01)
*B05C 11/02*  (2006.01)
*B05C 3/00*   (2006.01)
*B05D 5/12*   (2006.01)
*B05D 1/18*   (2006.01)
*D21G 3/00*   (2006.01)
*D21F 1/00*   (2006.01)

(52) U.S. Cl. .......... 118/413; 118/56; 118/404; 118/423; 427/77; 427/430; 162/272; 162/282; 162/352; 162/354

(58) Field of Classification Search ............ 118/56, 118/419, 413, 261; 427/77, 430; 162/352, 162/354, 374, 280, 281
See application file for complete search history.

(56) References Cited

U.S. PATENT DOCUMENTS
3,917,504 A * 11/1975 Neer ................. 156/453
(Continued)

FOREIGN PATENT DOCUMENTS
JP    7-85869    3/1995
(Continued)

OTHER PUBLICATIONS
Extended European Search Report issued in European Patent Application No. 06731565.5-2119, dated Jan. 18, 2011.

*Primary Examiner* — Yewebdar Tadesse
*Assistant Examiner* — Karl Kurple
(74) *Attorney, Agent, or Firm* — McDermott Will & Emery LLP

(57) ABSTRACT

An electrode mixture paste (5) is applied on both sides of a strip of core material (1) as it runs along its lengthwise direction, and the coating thickness of the paste (5) is adjusted as the core material (1) coated with the paste (5) passes through a gap between a pair of scraper tools (16a, 16b). Tips (18) provided to the scraper tools (16a, 16b) scrape off the paste (5) to form a paste-coated portion of a predetermined width. The electrode mixture paste (5) scraped off with the tips (18) is returned through recesses (19) on the upstream side of the tips (18) in the running direction of the core material, so as to prevent the phenomenon where the coating thickness is increased at both side edges of the paste-coated portion. Thus, a method for applying electrode mixture paste is realized that can prevent the phenomenon where the coating thickness is increased at both side edges of the paste-coated portion and prevent process failures such as deformation of paste-coated sheet.

2 Claims, 4 Drawing Sheets

U.S. PATENT DOCUMENTS

| | | | | |
|---|---|---|---|---|
| 4,964,336 | A | * 10/1990 | Bock et al. | 101/157 |
| 7,909,068 | B2 | * 3/2011 | Nakai et al. | 141/1.1 |
| 2009/0202707 | A1 | * 8/2009 | Usui et al. | 427/58 |

FOREIGN PATENT DOCUMENTS

| | | | |
|---|---|---|---|
| JP | 1993-085869 | * | 3/1995 |
| JP | 9-55205 | | 2/1997 |
| JP | 9-63578 | | 3/1997 |
| JP | 9-134722 | | 5/1997 |
| JP | 9-306479 | | 11/1997 |
| JP | 10-156245 | * | 6/1998 |
| JP | 11-242957 | | 9/1999 |
| JP | 11-339791 | | 12/1999 |
| JP | 2001-297756 | | 10/2001 |
| JP | 2002-134106 | | 5/2002 |

* cited by examiner

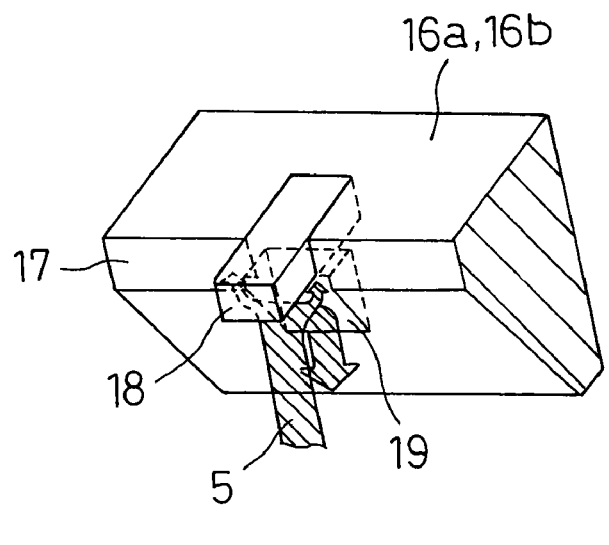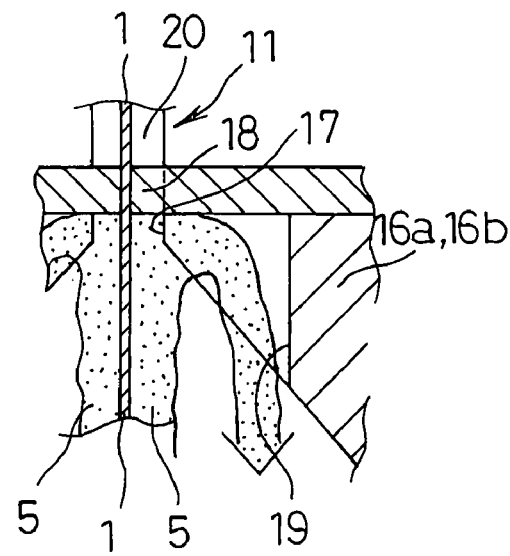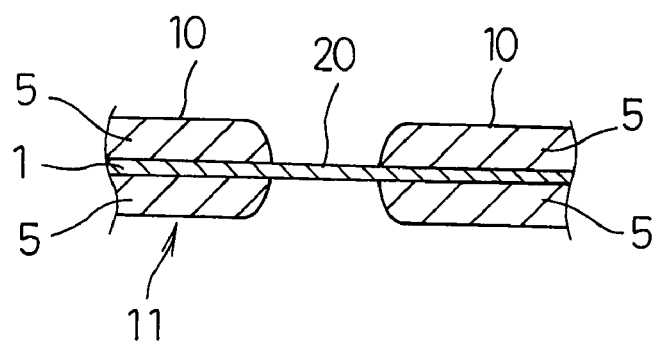

APPARATUS FOR APPLYING ELECTRODE MIXTURE PASTE WITH HOMOGENEOUS DISTRIBUTION OF COATING AMOUNT OF ELECTRODE MIXTURE PASTE

This application is the U.S. National Phase under 35 U.S.C. §371 of International Application No. PCT/JP2006/307618, filed on Apr. 11, 2006, which in turn claims the benefit of Japanese Application No. 2005-126292, filed on Apr. 25, 2005, the disclosures of which Applications are incorporated by reference herein.

TECHNICAL FIELD

The present invention relates to a method and an apparatus for applying electrode mixture paste, and in particular to a method and an apparatus for applying electrode mixture paste on a running strip of core material with a uniform coating distribution in the widthwise direction.

BACKGROUND ART

Alkaline rechargeable batteries and lithium ion rechargeable batteries are widely used as the power source of portable devices, electric tools, or electric vehicles. Nickel metal hydride rechargeable batteries, among others, have a relatively high energy density and excellent durability, and have found increasing applications particularly in electric vehicle power source systems.

The main compositions of nickel metal hydride rechargeable battery are, generally, a positive electrode formed of a three-dimensional porous metal body filled with nickel hydroxide and other components, and a negative electrode formed of a core material which is a porous metal film such as punched metal and electrode mixture paste composed of hydrogen-absorption alloy and other components applied on the core material. Of these two, the negative electrode is attracting attention because of its potential for continuous production and possibilities of highly efficient manufacture. More specifically, a known technique is such that the core material is immersed in the electrode mixture paste and coated with the paste on both sides, after which the thickness of the applied paste is adjusted.

A known technique for adjusting the coating amount of electrode mixture paste to a predetermined range is to pass the core material coated with the electrode mixture paste through a gap between a pair of scraper tools to scrape off redundant paste. Tips provided to the scraper tools scrape off the electrode mixture paste to form non-coated portions where the core material is exposed at both ends of a predetermined coating width, whereby a paste-coated portion with the predetermined width is formed.

When using nickel metal hydride rechargeable batteries for electric vehicles, more than 100 cells need be mounted per one car, and therefore the electrodes must be produced with high precision and efficiency. One specific example of the production method is to prepare a paste-coated sheet first, which has multiple lines of paste-coated portions by forming a plurality of the above-mentioned non-coated portions in the widthwise direction that is orthogonal to the running direction of the core material, and to roll and cut the sheet into separate pieces with good precision, utilizing the non-coated portions (see, for example, Patent Document 1).

[Patent Document 1] Japanese Patent Laid-Open Publication No. 2001-297756

DISCLOSURE OF THE INVENTION

Problems to be Solved by the Invention

To achieve such a paste-coated sheet as described in Patent Document 1, the scraper tools for adjusting the coating thickness require tips (one more than the predetermined number of paste-coated portions) at positions that determine both ends of each paste-coated portion.

However, when tips 23 are arranged on the scraper tools 21 such that they protrude from the coating thickness adjusting surfaces 22 as shown in FIG. 7 so that the electrode mixture paste 24 is scraped off by these tips 23 to form a non-coated portion 25 as shown in FIG. 8, the electrode mixture paste 24 that has been guided to directly below the tip 23 by the running core material collides the tip 23, bifurcates as indicated by the arrows in FIG. 7, and flows towards the sides of the paste-coated portions 26 on both sides. Thus the paste is not completely scraped off by the scraper tools 21 and remains on the core material 27 as it runs downstream, resulting in a condition where the coating amount is large at both widthwise edges of the paste-coated portions 26 as shown in FIG. 8 (hereinafter referred to as "dog-bone" phenomenon). If the dog-bone shape is prominent, the paste-coated sheet may be deformed when it is taken up at the last stage because of the edge beads where the coating amount is large overlapping each other, which will deteriorate the process yield ratio. This problem is evident when several lines of paste-coated portions are formed as in Patent Document 1, but it also applies when there is only one paste-coated portion.

In view of the problems in the conventional techniques described above, an object of the present invention is to provide a method and an apparatus for applying electrode mixture paste, which can prevent the so-called "dog-bone" phenomenon where coating thickness is increased at both side edges of a paste-coated portion, thereby preventing process failures such as deformation of paste-coated sheets.

Means for Solving the Problems

To achieve the above object, the present invention provides a method for applying an electrode mixture paste, including: an application step of applying an electrode mixture paste on both sides of a strip of core material as the core material runs along its lengthwise direction; and a coating thickness/width adjusting step of adjusting a coating thickness of the electrode mixture paste as the core material coated with the electrode mixture paste passes through a gap between a pair of scraper tools, and forming a paste-coated portion of a predetermined width by scraping off the electrode mixture paste using tips provided to the scraper tools, the electrode mixture paste scraped off with the tips being returned through recesses on an upstream side of the tips in a running direction of the core material.

With this configuration, the coating thickness of the electrode mixture paste applied on both sides of the core material is adjusted with the pair of scraper tools, and with the tips provided to the scraper tools, one or a plurality of paste-coated portions of a predetermined width are formed. Moreover, most of the electrode mixture paste that has flowed toward the tips is smoothly returned through the recesses provided on the upstream side of the tips in the running direction of the core material, whereby the "dog-bone" phenomenon in which the coating thickness is increased at both side edges of the paste-coated portion is prevented, and process failures such as deformation of paste-coated sheet are prevented.

The scraper tools may include at least three tips each including the two at both sides of the core material. A plurality of paste-coated portions may be formed in the widthwise direction of the core material. The above effects are evidently exhibited when a plurality of paste-coated portions are formed.

A tip width w may be in a range of from 2 to 10 mm, and a protruding length p of side edges of the recess from side edges of the tip may be in a range of from −0.1 w to 0.5 w, so that, when forming non-coated portions of a width of 2 to 10 mm, not only the above effect of preventing the unwanted deposits of paste at side edges of the paste-coated portion is reliably achieved, but also a converse situation is prevented, where the coating thickness is excessively decreased at both side edges of the paste-coated portion, which is caused when the recess width is too large relative to the tip width, because of which the electrode mixture paste on both sides of the tip is all scraped off and returned. Thus, a uniform coating thickness is reliably achieved over the entire width of the paste-coated portion. The protruding length p is substantially equal on left and right side ends of the recess, i.e., the recess width can be expressed roughly as w+2 p.

The present invention also provides an apparatus for applying an electrode mixture paste, including: an uncoiler unit for unwinding a core material from a coil thereof; a coating unit where the core material is immersed in an electrode mixture paste to coat the core material with the paste on both sides; a coating thickness/width adjusting unit for adjusting a coating thickness and a coating width of the electrode mixture paste; a drying unit for drying the electrode mixture paste; and a coiler unit for taking up the core material into a coil on which the electrode mixture paste has been applied and dried, wherein the coating thickness/width adjusting unit includes a pair of scraper tools for adjusting a coating thickness as the core material coated with the electrode mixture paste passes through a gap between the scraper tools, with tips provided to the scraper tools for scraping off the electrode mixture paste to define one end of a coating width, and recesses provided on an upstream side of the tips in a running direction of the core material.

With this structure, by setting coils of core material in the uncoiler unit and starting the application apparatus, the coiler unit produces coils of finished core material on both sides of which the one or more paste-coated portions have been formed, the paste-coated portions being formed on both sides of the core material with the thickness and width being appropriately adjusted, and the thickness being uniform over the entire width of the paste-coated portion, by the above application method.

The scraper tools may include at least three tips each including the two at both sides of the core material and a plurality of paste-coated portions may be formed in the widthwise direction of the core material, because the above effects are evidently exhibited when a plurality of paste-coated portions are formed. The tip width w may be in a range of from 2 to 10 mm, and the protruding length p of side edges of the recess from side edges of the tip may be in a range of from −0.1 w to 0.5 w, so that the unwanted deposits or lack of paste at side edges of the paste-coated portion are reliably prevented as described above, and a uniform coating thickness is reliably achieved over the entire width of the paste-coated portion.

BRIEF DESCRIPTION OF THE DRAWINGS

FIG. 3A is a perspective view and FIG. 3B is a longitudinal side view for explaining the operation of the tips and the recesses in this embodiment;

FIG. 4 is a cross-sectional view of paste-coated portions and a non-coated portion formed according to this embodiment;

BEST MODE FOR CARRYING OUT THE INVENTION

One embodiment of the method and apparatus for applying electrode mixture paste of the present invention will be hereinafter described with reference to FIG. 1 to FIG. 6.

Figure 1:
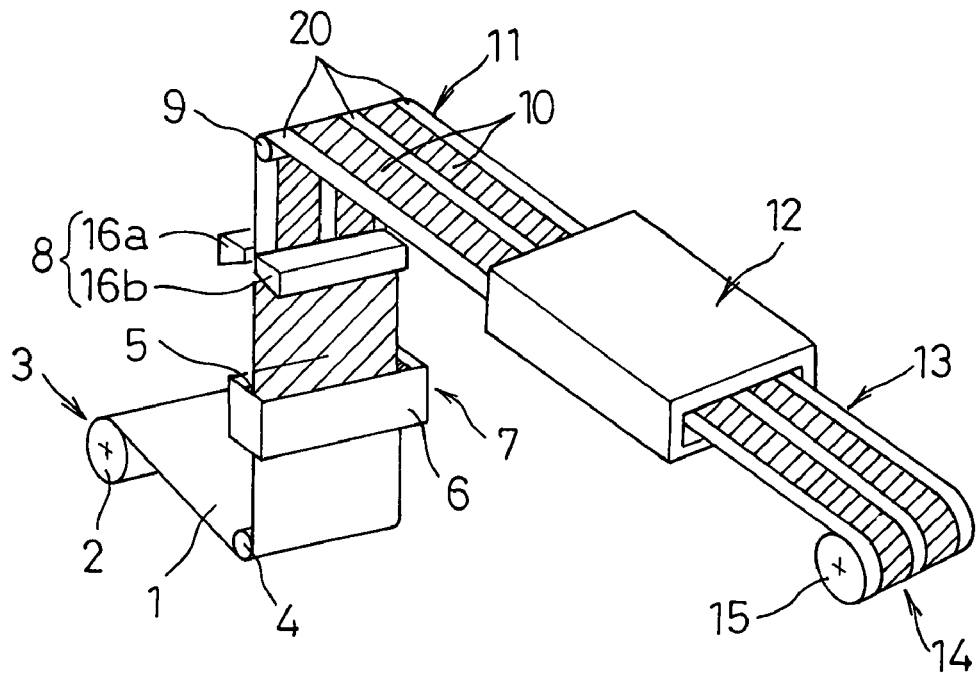
FIG. 1 is a schematic perspective view illustrating the structure of one embodiment of an apparatus for applying electrode mixture paste in accordance with the present invention.

FIG. 1 is a perspective view illustrating the schematic overall structure of one embodiment of the application apparatus. The application apparatus includes an uncoiler unit 3 which holds a coil of core material 2 prepared by winding a strip of a core material 1 made of metal film and unwinds the strip of core material 1. The core material 1 is drawn out horizontally from the uncoiler unit 3, turned about 90° around a guide roller 4 to be directed upwards and to run into a coating unit 7. The coating unit 7 includes a paste bath 6 filled with an electrode mixture paste 5, with the core material 1 being arranged to run through the paste bath 6, so that the core material 1 is coated with the electrode mixture paste 5 on both sides in this coating unit 7.

The core material 1 coated with the electrode mixture paste 5 runs approximately upwards and passes through a coating thickness/width adjusting unit 8 where the coating thickness and the coating width of the paste 5 are adjusted, and comes out as a paste-coated sheet 11 with one or a plurality of paste-coated portions 10. The paste-coated sheet 11 turns about 90° around a guide roller 9 to be directed to the horizontal direction, runs into a drying unit 12 where the electrode mixture paste 5 is dried, and comes out as an electrode sheet 13, which is taken up in a coiler unit 14 to produce a coil of electrode 15.

The coating thickness/width adjusting unit 8 is composed of a pair of scraper tools 16a and 16b for adjusting the coating thickness of the electrode mixture paste 5 by passing the core material 1 coated with the paste 5 through the gap between these tools. At least one of the pair of scraper tools 16a and 16b is formed with a plurality of thin-plate projections (not shown) in a comb arrangement to restrict the position of the core material 1 by making contact with the surface of the running core material 1.

Figure 2A:
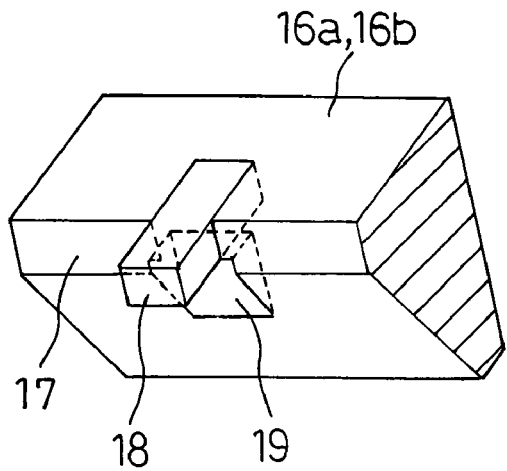
FIG. 2A is a perspective view and FIG. 2B is a front view illustrating a partial structure of the coating thickness/width adjusting unit in this embodiment.
Figure 2B:
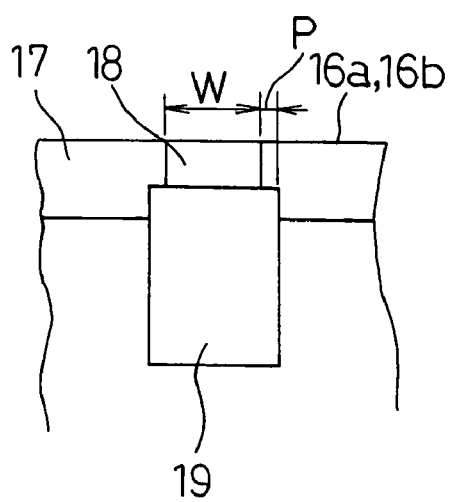

To scrape off the electrode mixture paste 5 at side ends of one or a plurality of paste-coated portions 10, so that non-coated portions 20 where no paste 5 is applied are formed at both side edges of the core material 1 and between the paste-coated portions 10, the pair of scraper tools 16a and 16b have tips 18 respectively as shown in FIG. 2A and FIG. 2B. The scraper tools 16a and 16b have respective coating thickness adjusting surfaces 17 parallel and opposite each other for restricting the coating thickness, and the tips 18 are protruded from these surfaces 17 so as to make contact with the surface of the core material 1. Each of the scraper tools 16a and 16b further includes a recess 19 on the upstream side of the tip 18 in the running direction of the core material 1, i.e., the recess 19 opens towards the coating unit 7.

Referring now to FIG. 2B, the width w of the tip 18 is set correspondingly to the width of the non-coated portion 20, usually from 2 to 10 mm. The width of the recess 19 is determined such that the protruding length p of the side edge of the recess 19 from the side edge of the tip 18 is in a range of from −0.1 w to 0.5 w. With p being in this range, preferably, when w is large, the protruding length p should be relatively small, and when w is small, p should be relatively large. The lower limit of the width of the recess 19 is almost the same as that of the width w of the tip 18. However, if w is large, the recess 19 can have a slightly smaller width than w, hence the lower limit of −0.1 w. The upper limit of the width of the recess 19, on the other hand, is about twice larger than the tip width w, the maximum possible protruding length on one side being 0.5 w.

Next, a description will be given of the action of the coating thickness/width adjusting unit 8 with reference to FIG. 3A, FIG. 3B, and FIG. 4. The core material 1 coated with the electrode mixture paste 5 enters the gap between the pair of scraper tools 16a and 16b, where redundant paste 5 is scraped off by the scraper tools 16a and 16b and finally the coating thickness is adjusted by the coating thickness adjusting surfaces 17, whereby paste-coated sheet 11, with the thickness of the coating being precisely adjusted, is produced.

The paste-coated sheet 11 is formed with one or a plurality of paste-coated portions 10 and non-coated portions 20 at both side edges of the core material 1 and between the paste-coated portions 10, as the electrode mixture paste 5 is scraped off by the tips 18 provided to the scraper tools 16a and 16b. When the tips 18 scrape off the electrode mixture paste 5, as shown in FIG. 3A and FIG. 3B, most of the paste 5 that has flowed towards the tips 18 is smoothly returned towards the coating unit 7 through the recesses 19 below the tips 18 (upstream side in the running direction of the core material 1), and only part of the paste is made to flow to the side of the tips 18. Therefore, as shown in FIG. 4, the so-called "dog-bone" phenomenon where the coating thickness is increased at both side edges of the paste-coated portion 10 is prevented, which prevents process failures such as deformation of the paste-coated sheet 11 when the electrode sheet 13 is turned into a coil.

Figure 5:
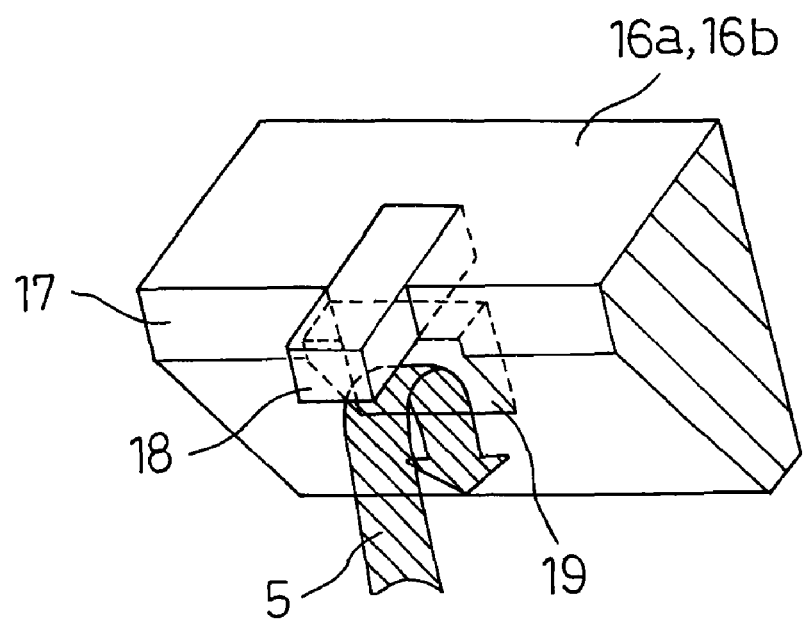
FIG. 5 is a perspective view illustrating a partial structure of the coating thickness/width adjusting unit in one example given for comparison with this embodiment.
Figure 6:
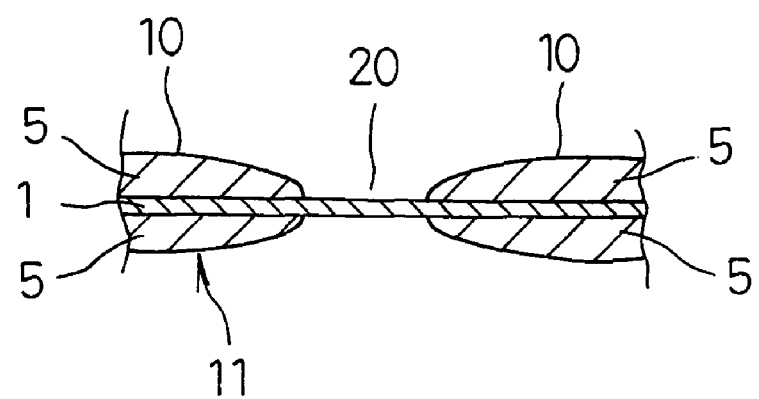
FIG. 6 is a cross-sectional view of paste-coated portions and a non-coated portion formed according to the comparative example.
Figure 7:
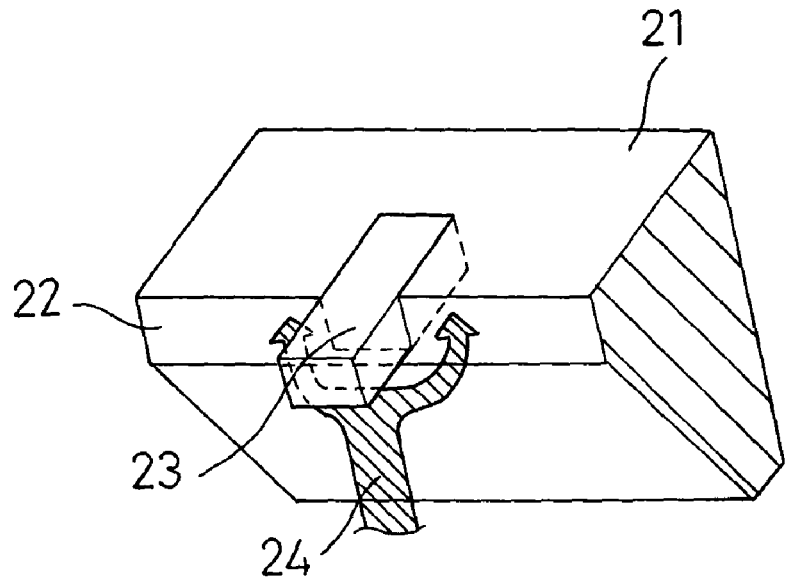
FIG. 7 is a perspective view illustrating a partial structure of the coating width adjusting unit in a conventional apparatus for applying electrode mixture paste.
Figure 8:
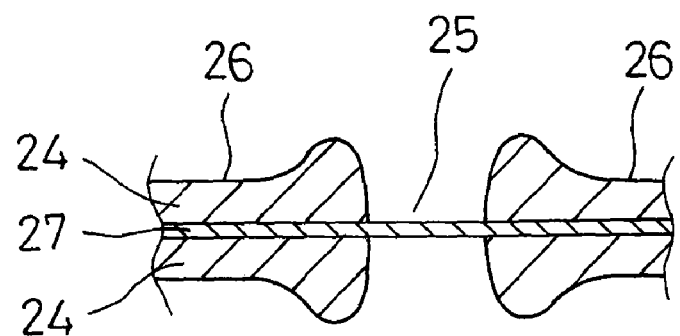
FIG. 8 is a cross-sectional view of paste-coated portions and a non-coated portion formed in the conventional apparatus.

On the other hand, if the width of the recesses 19 relative to the width of the tips 18 is larger than the above-mentioned upper limit, as shown in FIG. 5, the electrode mixture paste 5 near the sides of the tips 18 is scraped off and it all flows back towards the coating unit 7, which leads to a phenomenon where the coating thickness is decreased at both sided edges of the paste-coated portion 10, as shown in FIG. 6. Thus, the width of the recesses 19 is suitably set relative to the width w of the tips 18 as mentioned above so as to ensure that the coating thickness will be uniform over is the entire width of the paste-coated portion 10.

As is clear from the description of the embodiment above, the present invention is not limited to negative electrodes of nickel metal hydride rechargeable batteries as in the following working examples. For example, the invention is applicable to sintered substrates which are a precursor of sintered nickel positive electrode of an alkaline rechargeable battery, or positive or negative electrodes of lithium polymer batteries that use metal lath, which is a porous metal film.

The following is a description of working examples in which the present invention is applied to the negative electrode (hydrogen-absorption alloy electrode) of nickel metal hydride rechargeable battery, and comparative examples.

EXAMPLE 1

Hydrogen-absorption alloy expressed by the composition formula $MmNi_{3.55}Co_{0.75}Mn_{0.4}Al_{0.3}$ was pulverized in water by wet ball mill to achieve hydrogen-absorption alloy powder with a mean particle diameter of 30 μm. The hydrogen-absorption alloy powder was immersed in an alkaline aqueous solution for surface treatment, after which 10 kg of carboxymethyl cellulose solution with a solid component ratio of 1.5% and 0.4 kg of Ketjen black were added to 100 kg of the hydrogen-absorption alloy powder and kneaded, and then 1.75 kg of styrene-butadiene copolymer rubber particles in aqueous solution with a solid component ratio of 40% was added and stirred, to produce electrode mixture paste 6.

The electrode mixture paste was applied on both sides of a core material 1 made of nickel-plated punched iron sheet with a thickness of 60 μm, a width of 300 mm, a punched hole diameter of 1 mm, and a pore rate of 42% (total length of the coiled core material 2: 200 m). More specifically, the tips 18 and the recesses 19 were arranged relative to the scraper tools 16a and 16b so that two 135 mm wide paste-coated portions are formed with a 10 mm wide non-coated portion being at both sides of the core material and between the paste-coated portions. The tip width was 10 mm, while the recess 19 was 15 mm wide, i.e., the protruding length of the side edge of the recess from the side edge of the tip being 0.25 w where w is a tip width. The gap between the coating thickness adjusting surfaces 17 of the scraper tools 16a and 16b was adjusted so that the total coating thickness will be 260 μm, and the paste was applied at a speed of 5 m/min.

The paste was applied over a length of 200 m, after which the degree of the "dog-bone" phenomenon in the paste-coated sheet 11 was evaluated. More specifically, at a total of forty-four points, eleven points in the lengthwise direction and four points in the widthwise direction at every 20 m of the paste-coated sheet 11, the ratio of the side edge thickness to the center thickness of the paste-coated portion 10 was determined. The average ratio was 1.02.

EXAMPLES 2 TO 5

As compared to Example 1, the protruding length p of the side edge of the recess 19 from the side edge of the tip 18 was set −0.2 w, −0.1 w, 0.5 w, and 0.6 w for Examples 2 to 5, respectively. With other conditions being the same as those of Example 1, the electrode mixture paste 5 was applied.

The degree of the "dog-bone" phenomenon of these Examples 2 to 5 was evaluated similarly to Example 1. According to the results, the ratio of the side edge thickness to the center thickness of the paste-coated portion 10 was 1.12, 1.05, 0.96, and 0.84 in Examples 2 to 5, respectively.

COMPARATIVE EXAMPLE

The electrode mixture paste 5 was applied similarly to Example 1, the only difference from Example 1 being that no recesses 19 were provided. The degree of the "dog-bone" phenomenon was evaluated similarly to Example 1. According to the results, the ratio of the side edge thickness to the center thickness of the paste-coated portion was 1.27.

As described above, by providing the recesses 19 on the upstream side of the tips 18 that are for defining the side edges of the paste-coated portions 10 and for forming the non-coated portions 20, the "dog-bone" phenomenon that may lead to deformation of the paste-coated sheet 11 was largely reduced. It was also ascertained that a preferable range of the protruding length p of the recess 19 from the side edge of the tip was from −0.1 w to 0.5 w (w=width of the tip 18) as in Examples 1, 3, and 4 so as to restrict the ratio of the side edge thickness to the center thickness of the paste-coated portion 10 to 1±0.05.

INDUSTRIAL APPLICABILITY

As described above, according to the method for applying an electrode mixture paste of the present invention, the coating thickness of the paste applied on both sides of the core material is adjusted by the pair of scraper tools, and one or a plurality of paste-coated portions of a predetermined width can be formed by the tips provided to the scraper tools. Moreover, the recesses prevent the increase in the coating thickness at both side edges of the paste-coated portion, whereby process failures such as deformation of the paste-coated sheet are prevented. Therefore the present invention is highly applicable to electrode production techniques of various batteries with high productivity, and can be used in the production of electrodes of various batteries such as lithium ion batteries and nickel metal hydride batteries.

The invention claimed is:

1. An apparatus for applying an electrode mixture paste, comprising:

an uncoiler unit for unwinding a core material from a coil thereof;

a coating unit where the core material is immersed in an electrode mixture paste to coat the core material with the paste on both sides;

a coating thickness/width adjusting unit for adjusting a coating thickness and a coating width of the electrode mixture paste;

a drying unit for drying the electrode mixture paste; and a coiler unit for taking up the core material into a coil on which the electrode mixture paste has been applied and dried, wherein the coating thickness/width adjusting unit includes a pair of scraper tools for adjusting a coating thickness as the core material coated with the electrode mixture paste passes through a gap between the scraper tools, with tips provided to the scraper tools for scraping off the electrode mixture paste to define one end of a coating width, and recesses provided on an upstream side of the tips in a running direction of the core material, and wherein the recesses open towards the coating unit, and return at least part of the electrode mixture paste towards the coating unit, and side edges of the recess protrude past side edges of the tip by p, p being in a range of from −0.1 w to 0.5 w, where w is a width of the tip.

2. The apparatus for applying an electrode mixture paste according to claim 1, wherein each of the scraper tools includes at least three tips including the two tips at both side edges of the core material.

* * * * *

UNITED STATES PATENT AND TRADEMARK OFFICE
CERTIFICATE OF CORRECTION

| | |
|---|---|
| PATENT NO. | : 8,132,527 B2 |
| APPLICATION NO. | : 11/919233 |
| DATED | : March 13, 2012 |
| INVENTOR(S) | : Kimihiro Imamura et al. |

It is certified that error appears in the above-identified patent and that said Letters Patent is hereby corrected as shown below:

On Page 2 of the title page of the patent, under Item "(56) References Cited", under "FOREIGN PATENT DOCUMENTS", change "JP  1993-085869  3/1995" to

--JP  1995-085869  3/1995--.

Signed and Sealed this
Nineteenth Day of June, 2012

David J. Kappos
*Director of the United States Patent and Trademark Office*